United States Patent
Luther (10) Patent No.: US 6,364,654 B1
(45) Date of Patent: Apr. 2, 2002

(54) MOLD ASSEMBLY FOR MANUFACTURING A PLASTIC TUB WITH HOLES

(76) Inventor: LeRoy D. Luther, 3050 Kings View La., Brookfield, WI (US) 53005

(*) Notice: Subject to any disclaimer, the term of this patent is extended or adjusted under 35 U.S.C. 154(b) by 0 days.

(21) Appl. No.: 09/678,998

(22) Filed: Oct. 4, 2000

Related U.S. Application Data (60) Provisional application No. 60/157,941, filed on Oct. 6, 1999.

(51) Int. Cl.[7] .............................................. B29C 45/40
(52) U.S. Cl. ........................ 425/556; 264/334; 425/577; 425/DIG. 58
(58) Field of Search ................................ 425/577, 556, 425/DIG. 58; 264/318, 334

(56) References Cited

U.S. PATENT DOCUMENTS

| | | |
|---|---|---|
| 4,502,660 A | 3/1985 | Luther et al. |
| 4,678,158 A | 7/1987 | Brock |
| 4,881,891 A | 11/1989 | Luther |
| 4,923,388 A * | 5/1990 | Nakamura .................. 425/577 |
| 5,167,898 A | 12/1992 | Luther |
| 5,287,989 A | 2/1994 | Luther |
| 5,431,556 A | 7/1995 | Luther |
| 5,881,909 A | 3/1999 | Crain et al. |

* cited by examiner

Primary Examiner—Tim Heitbrink
(74) Attorney, Agent, or Firm—Quarles & Brady, LLP (57) ABSTRACT

Disclosed is an integrally molded plastic washing machine tub having a circular bottom and annular sidewalls formed with drain holes, the drain holes being encircled by a tapered, raised annulus on the inner surface of the sidewall. The design of the drain holes allows removal of the tub from the mold following molding, and prevents the snagging of fabrics placed in the tub.

23 Claims, 5 Drawing Sheets

MOLD ASSEMBLY FOR MANUFACTURING A PLASTIC TUB WITH HOLES

CROSS-REFERENCE TO RELATED APPLICATIONS

This application claims the benefit of U.S. Provisional Application No. 60/157,941 filed on Oct. 6, 1999.

STATEMENT REGARDING FEDERALLY SPONSORED RESEARCH OR DEVELOPMENT

Not applicable.

BACKGROUND OF THE INVENTION

Clothes washing machines generally contain a tub for holding the clothes being washed. These tubs have a circular bottom and an annular wall extending upward from the bottom's peripheral edge. They also have numerous drain holes for allowing water to drain freely from the tub during the washing process.

Washing machine tubs are often cast from metal, with the drain holes formed during the casting process. Once cast, these tubs are generally coated with porcelain to provide a smooth surface and a clean appearance.

Washing machine tubs may also be made of molded plastic. Plastic tubs offer advantages over metal tubs in that they are lighter and made from relatively inexpensive starting materials. The manufacture of such tubs, however, may also be time consuming and labor intensive as conventional production methods often require additional steps or further finishing. For example, conventional methods typically require the manufacture to mold the tub in one operation, drill drain holes into the tub in a second operation, and then deburr and recess the drain holes in a third operation.

Recent injection mold assemblies have been configured to avoid the assembly and finishing operations mentioned above. These assemblies are known in the art and often require the use of metal core pins which engage an opposing mold surface to form the drain holes. Unfortunately, these assemblies have also proven to be both expensive to maintain and susceptible to wear. For instance, the core pins on these assemblies often require precise machining within tight tolerances to ensure that each pin is of the correct length to properly match its opposing mold surface. Moreover, the repeated engagement between each core pin and its opposing mold surface will often result in wear on both the mold surface and the pin. This wear, in turn, will typically cause a flashing to form over the molded drain hole, that must be removed before placed into operation. The worn core pin may also require replacement by another core pin machined to the exact length as the replaced core pin.

The removal of the molded tubs from the injection molding machines has also proven to be difficult. This difficulty arises from the shape of the tub and the circular raised solid surfaces on the mold which provide for the recessing of the drain holes. In particular, the raised mold surfaces hinder the removal of the tub as the tub invariable catches on the raised solid surface of the molding machines' central mold core.

More recent mold assemblies have sought to avoid the above difficulties by altering the design of the drain holes. For example, U.S. Pat. No. 5,881,909 and U.S. Pat. No. 5,287,989 (both incorporated herein by reference) describe an improved injection molded plastic tub having drain holes with teardrop-shaped grooves on the inner surface of the tub sidewall. U.S. Pat. No. 5,167,898 (incorporated herein by reference) also describes a mold assembly and method for producing such a tub. The orientation and configuration of these teardrop-shaped grooves eases separation and removal of the molded tub from the mold core.

Notwithstanding the foregoing, there still remains a need in the art for improved methods of molding plastic washing tubs which facilitate separation of the tub from the mold.

BRIEF SUMMARY OF THE INVENTION

The present invention provides a plastic washing machine tub produced as a one piece, integrally molded and finished unit configured for easy removal from a tub mold assembly. The washing machine tub also includes drain holes arranged to prevent the snagging of fabrics placed in the tub and configured to promote the easy removal of the tub from its mold assembly. The present invention also provides a mold assembly for making such a tub.

One aspect of the present invention is a plastic washing machine tub comprising a substantially circular base wall and a generally cylindrical sidewall extending upward from the peripheral edge of the base wall to a terminal edge. The sidewall has an inner surface and an outer surface and a plurality of drain holes extending therethrough. The inner surface of the sidewall has a raised annulus formed about each drain hole, said annulus being tapered with the height of the raised annulus being greatest proximate to the periphery of the drain hole and gradually decreasing radially outward from the drain hole to form a gradual transition between the raised annulus and the inner surface.

Another aspect of the present invention is an improved injection mold assembly configured to produce the above-described washing machine tub. In one embodiment, the mold assembly comprises a plurality of mold core pins which are engageable with substantially circular depressions on a central mold core to produce the raised annulus on the inner surface of the tub when the mold assembly is closed. The depressions are configured and arranged to facilitate separation of the tub from the central mold core and withdrawal of the tub from the mold assembly. The core pins are preferably elastically deformable in response to engagement with the depressions, reducing the wear on both the core pins and the depressions and, thereby, making the mold assembly more durable. The mold assembly also preferably incorporates selected slanted molding surfaces to provide draft to the sidewalls of the molded tub to further ease removal of the tub from the mold assembly.

Another aspect of the present invention is a method for manufacturing a one-piece, injection molded washing machine tub having a substantially circular base wall and a generally cylindrical sidewall extending upward from the peripheral edge of the base wall, the sidewall including a plurality of drain holes extending therethrough with a tapered, raised annulus formed about each drain hole on the sidewall's inner surface, said annulus having a height greatest proximate to the periphery of the drain hole and decreasing radially outward therefrom to form a gradual transition between the annulus and the sidewall's inner surface. The method employs a mold assembly comprising opposed first and second mold dies, a central mold core extending from the first mold die and including a plurality of substantially circular depressions, and a plurality of side mold dies around the mold core, each side mold die having a plurality of core pins. The first step comprises placing the first and second mold dies and the side mold dies in a mold closed position wherein the first and second mold dies and the side mold dies define a mold cavity conforming to the dimensions of the tub. While in this closed position, the core pins engage the substantially circular depressions on the mold core to form drain holes in the tub. Plastic is then injected into the mold cavity to form the molded tub. To remove the tub from the mold assembly, the second mold die is displaced away from the first mold die to an open position relative to the first mold die, and the side mold dies are displaced outwardly to withdraw the core pins from the drain holes formed in the molded tub. The molded tub is then displaced from the mold core.

It is one object of the present invention to provide a method and apparatus for molding a one piece, integrally molded and finished tub that is easy to remove from its mold assembly once molded.

It is another object of the present invention to provide a method and apparatus for molding a one piece, integrally molded and finished tub that does not snag the fabric placed therein.

It is yet another object of the present invention to provide a one-piece, integrally molded and finished washing machine tub which can be easily removed from its mold assembly once formed, and which does not snag the fabrics placed therein.

One advantage of the present invention is that the tapered, raised annuluses disclosed in the present invention facilitate the removal of the molded tub from its mold assembly while preventing the tub's drain holes from snagging fabrics placed therein.

Another advantage of the present invention is that the tub can be manufactured using resilient core pins and elastically deformable inner pins so as to reduce the wear placed upon the mold assembly while facilitating the use of replacement parts.

Other features and advantages of the invention will become apparent to those skilled in the art upon review of the following detailed description, claims and drawings.

DETAILED DESCRIPTION OF THE INVENTION

The present invention provides a plastic washing machine tub produced as a one piece, integrally molded and finished unit configured for easy removal from a tub mold assembly. The washing machine tub includes drain holes designed to both prevent snagging of fabrics placed in the tub and promote easy removal of the molded tub from an injection mold assembly.

Figure 1:
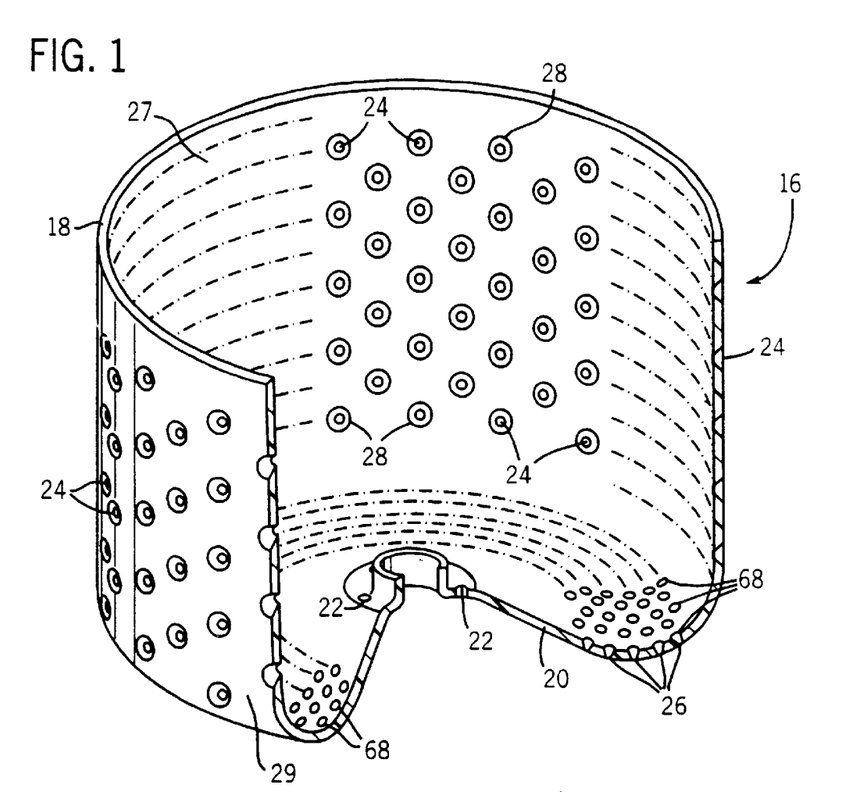
FIG. 1 is perspective view, partially broken away, of a washing machine tub formed using the mold assembly of the present invention.

As shown in FIG. 1, the molded tub 16 is of a single piece, integrally molded construction and includes a generally cylindrical or annular sidewall 18 extending upwardly from a tub base or bottom wall 20 to a terminal edge. The tub sidewall 18 diverges slightly outwardly from the tub base wall 20 to ease removal of the tub 16 from its mold assembly. The sidewall also has an interior surface 27 and an exterior surface 29.

To facilitate attaching the tub 16 to a washing machine, holes 22 are provided. Additionally, to permit water to drain from the tub 16, a plurality of apertures or drain holes 24 and 26 are formed in the tub sidewall 18 and the base wall 20, respectively. To reduce the possibility of clothes snagging on the tub 16, the drain holes 24 are encircled by a tapered, raised annulus 28 on the inner surface 27 of the tub 16. The drain holes 24 and the raised annuluses 28 are formed in the tub 16 as an integral part of the molding process, as is more fully explained below.

Figure 2:
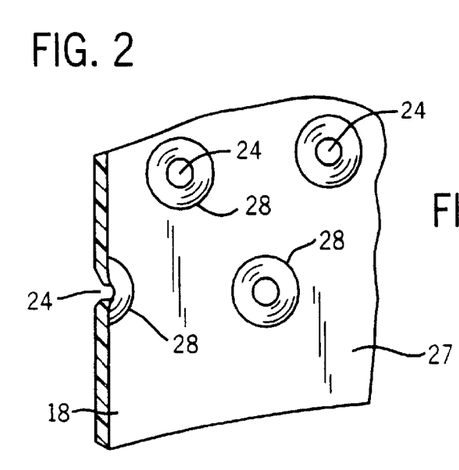
FIG. 2 is an enlarged view of a portion of the interior of the tub illustrated in FIG. 1.
Figure 3:
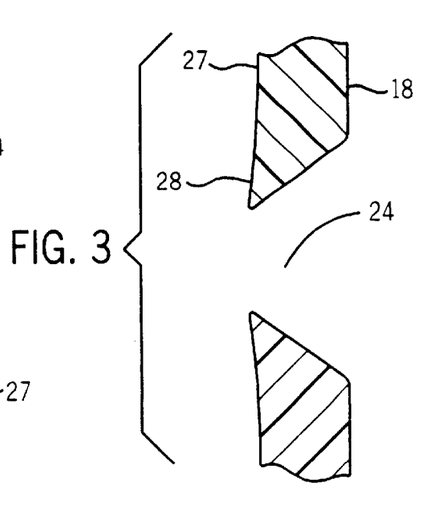
FIG. 3 is a cross-sectional view of a drain hole in a sidewall of the tub illustrated in FIG. 1.

It is the geometry of the drain holes 24 that is important here. As shown in FIGS. 2 and 3, the interior surface 27 of sidewall 18 has a tapered, raised annulus 28 integrally formed about each drain hole 24. The height of the raised annulus 28 is greatest just external to the periphery of the drain hole 24 and gradually decreases radially outward from the drain hole 24 to form a gradual transition between the raised annulus 28 and the inner surface 27. The raised annulus 28 is not very high (i.e., about 0.20 inches), but is noticeably raised relative to the inner surface 27 of the tub 16. The junction between the raised annulus 28 and the drain hole 24 has a radius of curvature to prevent sharp corners from occurring. This feature provides two important advantages. First, the design of the sidewall surprisingly facilitates removal of the tub 16 from the mold assembly without causing damage to the tub. Secondly, the design prevents the potential snagging of fabrics placed in the tub which can occur as a result of sharp edges existing at the intersection of the drain holes and the tub's inner surface.

Figure 6:
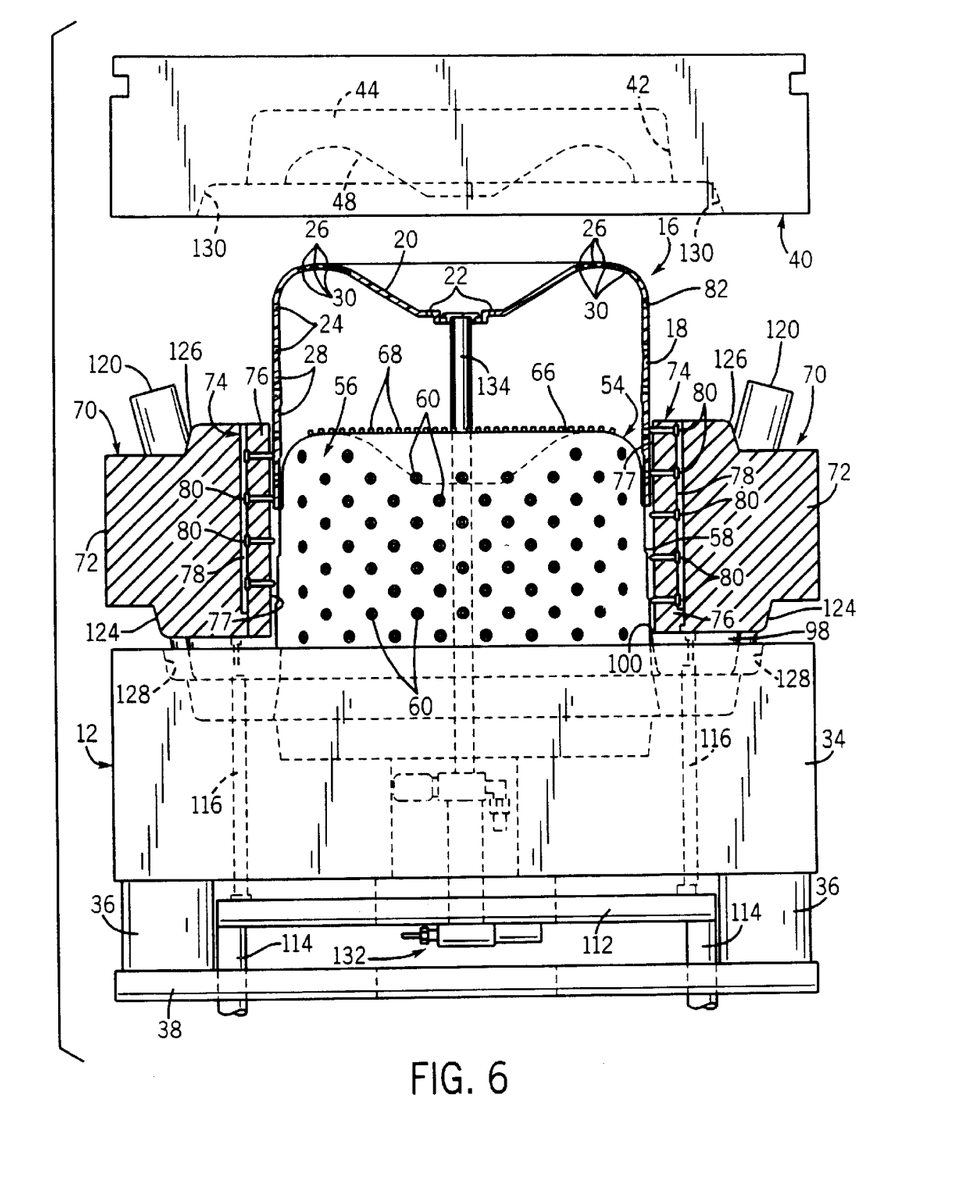
FIG. 6 is an elevation view similar to FIG. 4 with the mold assembly in an open position wherein the molded article can be removed from the mold.

Another aspect of the invention is a mold assembly 12 that is operably mounted in the injection molding machine (not shown) so as to be positionable between a mold closed position (shown in FIG. 4) and a mold open position (shown in FIG. 6).

Figure 4:
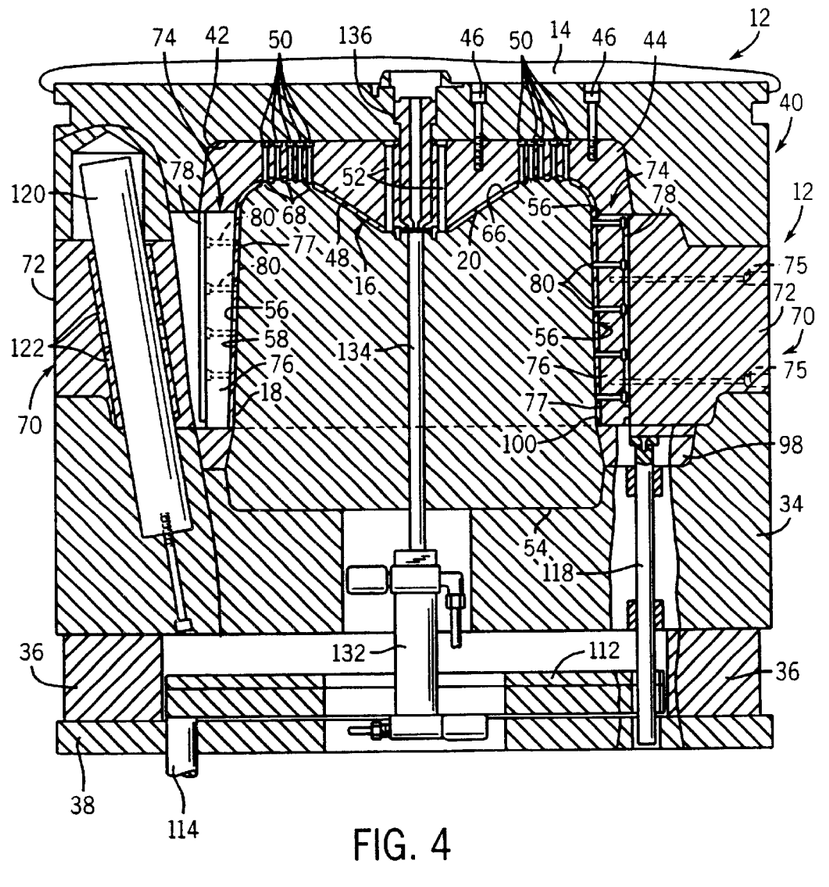
FIG. 4 is an elevation view of part of an injection molding assembly shown in section and with portions broken away illustrating the mold assembly in a closed position around a molded article.

The mold assembly 12 includes a first mold die or plate 34 fixed on rails 36 that are fixed to a support plate 38 and a second mold die or plate 40 in opposed relation to the first mold plate 34. The first and second mold plates 34 and 40 are supported by an injection molding machine in a conventional manner such that the mold plates 34 and 40 are moveable longitudinally toward and away from each other between mold open and closed positions as shown in FIGS. 4 and 6, by a moving support.

The second mold plate 40 includes a cavity 42, and a cavity insert or die member 44 preferably releaseably secured in the cavity 42 via threaded screw fasteners 46 or other suitable means. The die member 44 includes an inwardly facing molding surface 48 which forms the exterior side of the tub base wall 20. To form the drain holes 26 in the tub base wall 20, the second mold plate 40 is provided with a plurality of mold core pins 50 preferably arranged in generally annular, concentric rows which are staggered relative to one another. Additional mold core pins 52

(preferably four) are also provided to form the attachment holes 22 in the tub 16. The core pins 50 and 52 are preferably fixedly mounted to the die member 44 and protrude through the molding surface 48 and into the mold cavity when the mold assembly 12 is closed.

The mold assembly 12 also includes a central mold core 54 mounted on the first mold plate 34 and projecting therefrom in a direction parallel to the longitudinal axis 55 of the mold core 54. The mold core 54 includes an outer molding surface 56 having a generally cylindrical surface portion 58 which tapers slightly inwardly toward the free end of the mold core 54 and which forms the inner surface 27 of the tub sidewall 18. This tapered configuration provides draft to facilitate the removal of the tub 16 from the mold assembly 12. Although the draft or taper of the outer molding surface 56 could have other configurations, in the illustrated arrangement it tapers at a draft angle of about 3° with respect to a line 59 (see FIG. 7) perpendicular to the mold plates 34 and 40 and parallel to both the direction of movement of the mold plates 34 and 40 relative to one another and the longitudinal axis 55 of the mold core 54.

Figures 7, 8, 9, 10, 11:
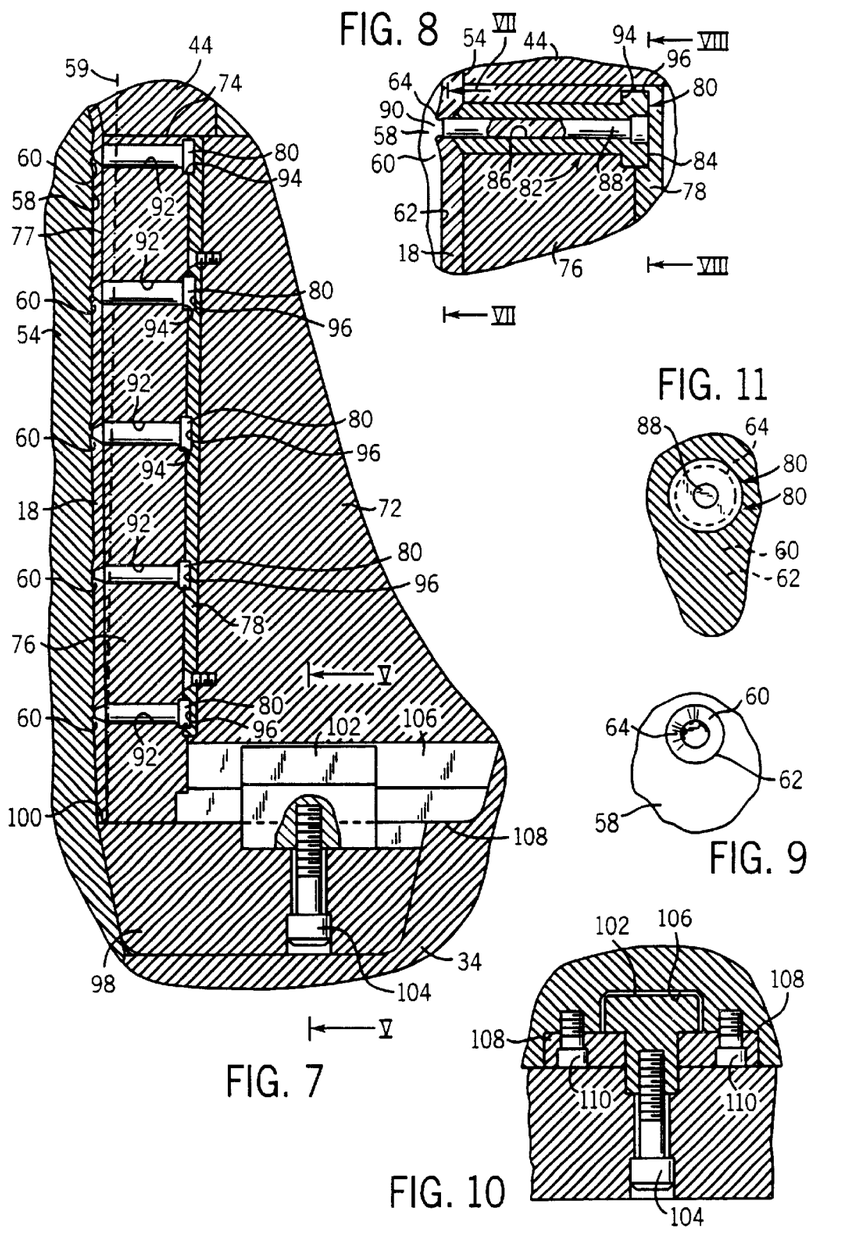
FIG. 7 is an enlarged view, partially broken away, of a portion of the mold assembly shown in FIG. 4.
FIG. 8 is a further enlarged view, partially in section, of a portion of the mold assembly shown in FIG. 4.
FIG. 9 is a view taken along line VII—VII in FIG. 8 and showing in elevation a circular depression on the mold core of the mold assembly.
FIG. 10 is a view taken along line V—V in FIG. 7.
FIG. 11 is a view taken along line VIII—VIII in FIG. 8.

The cylindrical surface portion 58 of the mold core 54 is provided with a plurality of depressed portions 60 (see FIG. 8) which are depressed or recessed from the remainder of the cylindrical surface portion 58. These depressions 60 are arranged in staggered rows and can be variously sized if desired. As shown in FIG. 9, the depression 60 may include a substantially circular trough (i.e., doughnut-shaped) that surrounds a circular portion 64 on the cylindrical surface portion 58 with the circular portion 64 being substantially planar with the nondepressed portions of the molding surface 58. Alternatively, the depression 60 may include a substantially circular depression wherein the circular portion 64 is the deepest part of the depression. Each depression 60 is tapered such that its depth is greatest proximal to the circular portion 64 and decreases radially outward therefrom. Each depression 60 forms a corresponding tapered, raised annulus 28 around one of the drain holes 24 in the interior surface of the molded tub 16. Each circular portion 64 of the cylindrical surface portion 58 corresponds with and is positioned to engage the end of a core pin when the first and second mold plates 34 and 40 are closed.

The orientation and configuration of the depressions 60 eases separation and removal of the molded tub 16 from the mold core 54. The depressions 60 are contoured to slide from the corresponding tapered, raised annulus 28 with minimal resistance when the molded tub 16 is removed from the mold core 54. In particular, the periphery of each depression 60 gradually and smoothly flares or merges into the annular surface portion 58, and the periphery of each depression 60 is curved or arcuate to converge into the surrounding cylindrical portion 58 of the mold core 54. These features provide a smooth transition from the depression 60 to the surrounding part of the cylindrical surface portion 58. In addition, the depth of each depression 60 becomes gradually shallower as the periphery thereof is approached from the circular center 64. These characteristics further facilitate extraction of the depression 60 from the corresponding raised annulus 28 and ease separation and removal of the molded tub 16 from the mold core 54. No grooves or other undesirable hollowing of the tub on its inner surface is required in order for the molded tub part to be pulled off of the mold core 54.

The outer molding surface 56 also includes a second surface portion 66 over the free end of the mold core 54 for forming the interior surface of the tub base wall 20. This second surface portion 66 includes a plurality of generally circular projections 68 raised from the remainder of the second surface portion 66 to form the circular depressions 30 in the interior surface of the tub 16. The circular projections 68 correspond with and are positioned to engage the ends of the core pins 50 when the first and second mold plates 34 and 40 are closed to recess the drain holes 26 in the tub base wall 20 to prevent fabrics from snagging thereon.

Figure 5:
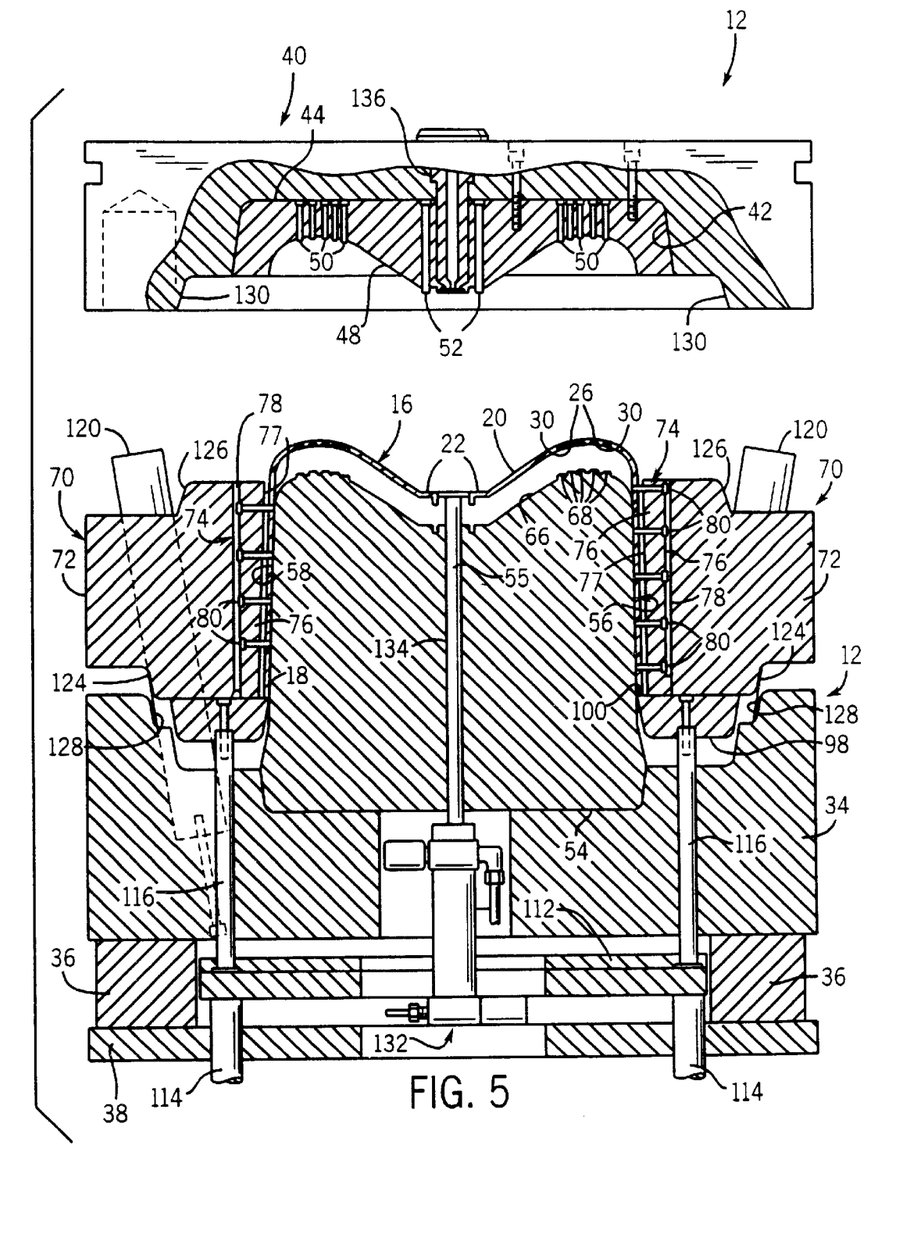
FIG. 5 is an elevation view similar to FIG. 4 showing the mold assembly partially open.

The injection mold assembly 12 also includes a plurality of sidewall assemblies 70 arranged to surround the mold core 54. Two sidewall assemblies 70 are shown in FIGS. 4–6, although four sidewall assemblies are preferred. Each sidewall assembly 70 includes a lifter or sidewall member 72 and a sidewall insert 74 releaseably fixed to the sidewall member 72 via threaded fasteners 75 (see FIG. 4) or other suitable means. This arrangement facilitates replacement of the sidewall insert 74, if desired. The sidewall inserts 74 each include an inner plate 76 having an inwardly facing molding surface 77 that tapers or slants inwardly preferably at the same angle as the draft angle of the molding surface 56. The molding surfaces 77 cooperate with the cylindrical surface portion 58 of the tapered mold core 54 to form the tub sidewall 18. Each molding surface 77 is preferably semi-circular to form a 90 degree arc portion of the exterior surface of the tub sidewall 18. Each sidewall insert 74 also includes an outer key plate 78 releaseably fixed to the inner plate 76 thereof to hold additional mold core pins in place, as will be further explained below.

To form the apertures or drain holes 24 in the tub sidewall 18, each sidewall assembly 70 is provided with a plurality of mold core pins 80 which can be variously sized if desired. As shown in FIG. 8, in the specific embodiment of the invention shown in the drawings, each of the core pins 80 includes an outer sleeve 82 including a head portion 84 and a bore 86. The outer sleeve 82 is preferably made of steel, although other materials could also be used. Each core pin 80 also includes an inner pin 88 housed in the bore 86. The inner pin 88 is made of a resilient, non-metallic material capable of withstanding the temperatures at which the mold assembly 12 operates without being significantly affected. While other materials can be employed, it is preferred that the inner pins 88 be made of a high temperature plastic or elastomeric material such is high temperature nylon or Delrin. In the illustrated embodiment, Delrin sold by Midland Plastics of Brookfield, Wis. under the part number 016-002-0021 is used. The inner pins 88 includes an end portion 90 which extends externally of the outer sleeve 82 and which is engageable with one of the depressions 60 when the mold assembly 12 closes. This engagement causes the inner pins 88, and especially the end portions 90, to be compressed and to elastically deform.

While in the illustrated arrangement each core pin 80 includes a metallic outer sleeve 82 and an inner pin 88 made of resilient non-metallic material, in other arrangements the resilient core pins 80 could have other constructions.

As shown in FIG. 7, the inner plates 76 of the mold sidewall assemblies 70 are provided with pin bores 92 having countersunk portions 94 to support the core pins 80. Each core pin 90 is received in one of the pin bores 92 with the head portion 84 thereof being housed in the countersunk portion 94. The outer plate 78 is also provided with conutersnuk portions 96 to receive the head portions 84 of the core pins 80. The outer plate 78 can be removed from the inner plate 76 to replace the core pins 80, if desired. In the illustrated arrangement, the pin bores 92 are arranged on the sidewall assemblies 70 to position the core pins 80 in annular staggered rows to correspond to the depressions 60. The core pins 80 project inwardly through the molding surfaces 77 of the sidewall assemblies 70 and are positioned in opposed facing relation to the depressions 60 on the mold core 54 so that the core pins 80 engage the depressions 60 when the mold assembly 12 is closed (see FIG. 4).

Sidewall moving supports are provided for supporting the mold sidewall assemblies 70 and for moving the sidewall assemblies between a closed or injection molding position (FIG. 4) and an open or retracted position (FIG. 6). While various sidewall moving support can be employed, in the illustrated arrangement the sidewall moving support includes a stripper ring 98 around the mold core 54 and for causing longitudinal movement of the mold sidewall assemblies 70 toward and away from the first mold plate 34. The stripper ring 98 includes an inner portion 100 which forms the top edge of the tub 16.

The illustrated sidewall moving support also includes an arrangement for mounting each of the mold sidewall assemblies 70 on the stripper ring 98 for limited lateral sliding movement relative thereto. This mounting arrangement includes four T-slot slide arrangements, an exemplary one of which is shown in FIGS. 7 and 10. The illustrated slide arrangement includes a T-shaped slide member 102 fixed to the stripper ring 98 by a threaded fastener 104 or other suitable means. The slide member 102 is received in a complementary slot 106 formed in part by a pair of wear plates 108 secured to the sidewall member 72 by threaded fasteners 110 or other suitable means.

The sidewall moving supports also provides a means for selectively moving the mold sidewall assemblies 70 between the injection mold and retracted positions. While various moving means can be employed, in the illustrated arrangement (FIGS. 4–6) the moving means includes a press knock arrangement including a knock-out plate 112 supported for longitudinal reciprocal movement by a plurality of rods 114 (only two of which are shown). Extension and retraction of the rods 114 to move the knock-out plate 112 is controlled by a hydraulic motor (not shown). The stripper ring 98 and the knock-out plate 112 are connected for common movement by a plurality of stripper lift pins 116 (see FIG. 5) that extend through the first mold plate 34. While it should be understood that the use of a plurality (preferably eight) of stripper lift pins 116 spaced around the circumference of the stripper ring 98 is preferred, only an exemplary pair of stripper lift pins 116 are shown in the drawings. Additionally, a plurality of guide pins 118 (preferably four), one of which is illustratively shown in FIG. 4, are provided to more accurately guide movement of the stripper ring 98.

The sidewall moving support also provides a means to cause movement of the mold sidewall assemblies 70 outwardly away from the mold core 54 in response to longitudinal movement of the stripper ring 98. In the illustrated arrangement (FIGS. 4–6), such means includes outwardly angling lifter or guide pins 120. While it is preferred that a pair of guide pins 120 guide the movement of each mold sidewall assembly 70, only one guide pin 120 is illustratively shown in FIG. 4. Each guide pin 120 is fixedly mounted on the first mold plate 34 and extends through bushings 122 in one of the sidewall members 72 to guide a mold sidewall assembly 70 in a predefined path between the injection molding and retracted positions.

To prevent outward deflection of the mold parts, and particularly the mold sidewall assemblies 70, during the plastic injection process, the mold assembly 12 includes a means for securing the mold sidewall assemblies 70 in the molding position when the mold assembly 12 is closed. While other securing means could be used, the illustrated securing means includes the provision of opposite sloping cam surfaces 124 and 126 on each mold sidewall assembly 70 and corresponding sloping cam surfaces 128 and 130 on the first and second mold plates 34 and 40, respectively. When the mold assembly 12 is closed, the cam surfaces 124 and 126 mate with and engage the cam surfaces 128 and 130 to form a cam interlock to secure the mold sidewall assemblies 70 against outward movement until the mold assembly 12 is opened. However, even in the event of slight outward deflections of the mold sidewall assemblies 70, the deformable inner pins 84 of the core pins 80 should stay engaged with the projections 60 to form satisfactory holes 24.

To assist in removing the molded tub 16 from the opened mold assembly 12, a hydraulic piston and cylinder assembly 132 or other suitable motor is mounted on the knock-out plate 112 for movement therewith. The piston and cylinder assembly 132 is connected to a remote hydraulic fluid source (not shown) and includes an extensible rod 134. The rod 134 has a distal end which is engageable with the tub bottom wall 20 to lift the tub 16 from the mold core 54 for subsequent withdrawal from the mold assembly 12.

To form the tub 16, the mold assembly 12 is first closed (see FIG. 4) to define a mold cavity conforming to the desired dimensions of the tub 16. Closing of the mold assembly 12 causes the inner pins 88 of the core pins 80 to resiliently engage the depressions 60 on the mold core 54, such engagement resulting in the elastic deformation of at least the end portions 90 of the inner pins 88. Additionally, with the mold assembly 12 closed, the core pins 50 and 52 in the second mold plate 40 respectively engage the circular projections 68 and the central part of the second surface portion 66 of the mold core 54. Plastic material is then injected into the mold cavity under desired temperature and pressure conditions to form the molded tub 16. In the illustrated arrangement, the plastic is introduced into the mold cavity through a sprue bushing 136 in the second mold plate 40 and from an injection nozzle (not shown), however other means could also be used to introduce plastic into the mold cavity.

Following formation of the molded tub 16, the first mold plate 34 is withdrawn from the second mold plate 40 followed by or simultaneously with retraction of the mold sidewall assemblies 70 to fully open the mold assembly 12. When the mold assembly 12 opens, the portion 100 of the stripper ring 98 engaging the top edge of the tub 16 pushes the tub 16 off the mold core 54 (see FIG. 5). As the tub 16 is moved from the mold core 54 each tapered, raised annulus 28 on the interior surface of the tub sidewall 18 gradually slides out of the depression 60. As the stripper ring 98 is moved in the direction of the second mold plate 40, the mold sidewall assemblies 70 also move laterally outwardly away form the mold core 54 to pull the ends of the core pins 80 out of the holes 24 formed in the molded tub 16. The draft provided by the tapered mold core 54 further eases separation and displacement of the tub 16 from the mold core 54. After the mold assembly 12 is opened, the rod 134 is extended to further displace the tub 16 from the mold core 54 (see FIG. 6) so that the tub 16 can thereafter be completely removed from the mold assembly 12 by a worker or by mechanical means.

Advantageously, the mold assembly 12 is configured to provide improved separation and removal of a molded article therefrom. More specifically, the mold assembly 12 incorporates substantially circular depressions 60, the shape, contour and orientation of which allows them to slide easily from the tapered, raised annuluses 28 formed thereby while still effectively recessing the drain holes 24 in the tub 16.

Thus, the molded tub 16 is more easily separated and removed from the mold assembly 12 than was possible with prior mold arrangements. Additionally, the draft provided by the tapered mold core 54 further facilitates removal of the tub 16 from the mold assembly 12.

A further advantage of the mold assembly 12 arises from the incorporation of resilient core pins 80 which facilitate integrally molding the drain holes 24 into the tub 16 during the injection molding operation. The elastically deformable inner pins 88 of the core pins 80 reduce wear in the mold assembly 12 and produce generally flash-free, good quality drain holes even in the presence of some wear, unlike core pins made entirely of metal. Thus, the resilient core pins 80 not only produce finished holes which do not require further drilling, deburring, or other finishing operations, but also lengthen the lives of the mold components to produce more economical molded tubs 16. Additionally, the resilient core pins 80, and particularly the inner pins 88, are replaceable with pins which are not exactly the same length as the pins being replaced, thereby further reducing the cost and maintenance associated with the mold assembly 12 that would otherwise be incurred if entirely metal core pins were used.

The above described advantageous features have been combined in the present invention to produce a one-piece, plastic injection molded and finished washing machine tub 16 which heretofore could not be satisfactorily and economically produced.

I claim:

1. A mold assembly for forming a molded article, the mold assembly comprising:
   a mold plate;
   a mold core projecting from the mold plate, the mold core including an outer surface portion adapted to form at least part of an inner surface of the article, the outer surface portion including at least one substantially circular depression adapted to form a tapered, raised annulus on the inner surface of the article;
   a plurality of sidewall assemblies, each sidewall assembly having an inwardly facing molding surface adapted to form a portion of an exterior surface of the article;
   a sidewall moving support for supporting the sidewall assemblies and moving the sidewall assemblies relative to the mold core between a mold closed position wherein the inwardly facing molding surfaces and the mold core cooperate to define at least part of a mold cavity which conforms to the dimensions of the article, and a mold open position wherein each of the mold sidewall assemblies is displaced outwardly of its mold closed position; and
   at least one core pin supported on one of said sidewall assemblies, the core pin positioned to engage said circular depression when the sidewall assembly is in its mold closed position, said core pin being adapted to form a hole in the article.

2. The mold assembly of claim 1 wherein the outer surface portion includes a plurality of the circular depressions, and at least one sidewall assembly includes a plurality of core pins, each core pin projecting from the inwardly facing molding surface and positioned to engage one of said circular depressions to facilitate formation of a hole in the article when the sidewall assembly is in its mold closed position, the hole being encircled by the tapered, raised annulus formed by the circular depression.

3. The mold assembly of claim 1 wherein the circular depression includes a center portion that is substantially planar with the non-depressed outer surface portion surrounding the circular depression.

4. The mold assembly of claim 1 wherein the tapered, raised annulus gradually merges into the inner surface of the article so as to provide a smooth transition therebetween.

5. The mold assembly of claim 1 wherein the circular depression has a periphery which is generally arcuate so as to converge into the outer surface portion surrounding the circular depression to form a gradual transition therebetween.

6. The mold assembly of claim 1 wherein the circular depression includes a center portion, and wherein the circular depression becomes gradually shallower as the periphery thereof is approached from the center portion.

7. The mold assembly of claim 1 wherein the core pin is made at least partially of a resilient non-metallic material.

8. The mold assembly of 7 wherein the core pin is elastically deformable.

9. A mold assembly for use in the manufacture of an article having an annular interior surface and an exterior surface, said mold apparatus comprising:
   a first mold plate;
   a second mold plate opposing said first mold plate;
   a moving support for supporting the first and second mold plates and for moving the first and second mold plates toward and away from each other between a mold open position and a mold closed position;
   a mold core projecting from the first mold plate in a direction parallel to the direction of movement of the first and second mold plates relative to one another, the mold core including a free end and a generally cylindrical outer mold surface portion tapering inwardly in the direction and toward the free end and being adapted to form the annular interior surface of the article, the outer mold surface portion including at least one substantially circular depression, the circular depression being adapted to form a tapered, raised annulus on the annular interior surface of the article;
   a plurality of sidewall assemblies, each sidewall assembly including an inwardly facing molding surface adapted to form a portion of the exterior surface of the article;
   a sidewall moving support for supporting the sidewall assemblies and for moving the sidewall assemblies relative to the mold core between a mold closed position wherein the inwardly facing molding surfaces and the mold core cooperate to define at least part of a mold cavity which conforms to the desired dimensions of the article, and a mold open position wherein each of the sidewall assemblies is displaced outwardly of its mold closed position; and
   at least one core pin supported on one of the sidewall assemblies, the core pin engaging the circular depression when said sidewall assembly is in its mold closed position, the core pin being adapted to form a hole in the article.

10. The mold assembly of claim 9 wherein the outer surface portion includes a plurality of the circular depressions, and at least one sidewall assembly includes a plurality of core pins, each core pin projecting from the inwardly facing molding surface and positioned to engage one of said circular depressions to facilitate formation of a hole in the article when the sidewall assembly is in its mold closed position, the hole being encircled by the tapered, raised annulus formed by the circular depression.

11. The mold assembly of claim 9 wherein the circular depression includes a center portion that is substantially planar with the non-depressed outer surface portion surrounding the circular depression.

12. The mold assembly of claim 9 wherein the tapered, raised annulus gradually merges into the inner surface of the article so as to provide a smooth transition therebetween.

13. The mold assembly of claim 9 wherein the circular depression has a periphery which is generally arcuate so as to converge into the outer surface portion surrounding the circular depression to form a gradual transition therebetween.

14. The mold assembly of claim 9 wherein the circular depression includes a center portion, and wherein the circular depression becomes gradually shallower as the periphery thereof is approached from the center portion.

15. The mold assembly of claim 9 wherein the core pin is made at least partially of a resilient non-metallic material.

16. The mold assembly of 9 wherein the core pin is elastically deformable.

17. A mold assembly for use in an injection molding process to mold a one-piece article including a generally cylindrical sidewall extending upwardly from a base wall, the sidewall having an inner surface and an outer surface and the base wall having an exterior side and an interior side, said mold assembly comprising:

a first mold plate;

a second mold plate opposing said first mold plate and including an inwardly facing molding surface adapted to form at least a portion of the exterior side of the base wall of the article;

a moving support for supporting the first and second mold plates and for moving the first and second mold plates toward and away from each other between a mold open position and a mold closed position;

a mold core projecting from the first mold plate in a direction parallel to the direction of movement of the first and second mold plates relative to one another, the mold core including a free end and an annular outer mold surface portion tapering inwardly toward said free end and being adapted to form the inner surface of the sidewall of the article, the annular outer mold surface portion including a plurality of substantially circular depressions, each depression being adapted to form a tapered, raised annulus on the inner surface of the sidewall;

a plurality of sidewall assemblies, each sidewall assembly including an inwardly facing molding surface adapted to form at least a portion of the outer surface of the annular sidewall;

a sidewall moving support for supporting the sidewall assemblies and for moving the sidewall assemblies between a mold closed position wherein the inwardly facing molding surfaces of the sidewall assemblies and the inwardly facing molding surface of the second mold plate and the mold core cooperate to define at least part of a mold cavity conforming to the desired dimensions of the article, and a mold open position wherein each sidewall assembly is displaced outwardly of its mold closed position; and a plurality of core pins mounted on at least one of the sidewall assemblies and projecting from the inwardly facing molding surface thereof, the core pins engaging the circular depressions on the mold core when the sidewall assemblies are in the mold closed position and being adapted to form a hole in the sidewall of the article, the hole being encircled by the tapered, raised annulus formed by the circular depression.

18. The mold assembly of claim 17 wherein each circular depression includes a center portion that is substantially planar with the non-depressed outer surface portion surrounding said circular depression.

19. The mold assembly of claim 17 wherein the tapered, raised annulus gradually merges into the inner surface of the article so as to provide a smooth transition therebetween.

20. The mold assembly of claim 17 wherein the circular depression has a periphery which is generally arcuate so as to converge into the outer surface portion surrounding the circular depression to form a gradual transition therebetween.

21. The mold assembly of claim 17 wherein the circular depression includes a center portion, and wherein the circular depression becomes gradually shallower as the periphery thereof is approached from the center portion.

22. The mold assembly of claim 17 wherein the core pin is made at least partially of a resilient non-metallic material.

23. The mold assembly of 17 wherein the core pin is elastically deformable.

* * * * *